US012394569B2

(12) United States Patent
Cho

(10) Patent No.: US 12,394,569 B2
(45) Date of Patent: Aug. 19, 2025

(54) MULTILAYER CAPACITOR

(71) Applicant: SAMSUNG ELECTRO-MECHANICS CO., LTD., Suwon-si (KR)

(72) Inventor: Beom Joon Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 164 days.

(21) Appl. No.: 17/977,239

(22) Filed: Oct. 31, 2022

(65) Prior Publication Data

US 2023/0215634 A1 Jul. 6, 2023

(30) Foreign Application Priority Data

Dec. 31, 2021 (KR) ........................ 10-2021-0193710

(51) Int. Cl.
*H01G 4/12* (2006.01)
*H01G 4/232* (2006.01)
*H01G 4/30* (2006.01)

(52) U.S. Cl.
CPC ........... *H01G 4/1227* (2013.01); *H01G 4/232* (2013.01); *H01G 4/30* (2013.01)

(58) Field of Classification Search
CPC ......... H01G 4/1227; H01G 4/232; H01G 4/30
USPC ............. 361/301.4, 311, 321.1, 321.2, 321.4
See application file for complete search history.

(56) References Cited

U.S. PATENT DOCUMENTS

| | | | | |
|---|---|---|---|---|
| 9,076,596 | B2 * | 7/2015 | Yoon | H01G 4/30 |
| 2009/0201628 | A1 | 8/2009 | Kagata et al. | |
| 2013/0194715 | A1 * | 8/2013 | Kim | H01G 4/30 156/60 |
| 2013/0301185 | A1 * | 11/2013 | Lee | H01G 4/30 361/301.4 |
| 2014/0022692 | A1 | 1/2014 | Yoon et al. | |
| 2017/0025222 | A1 * | 1/2017 | Park | H01G 4/1209 |
| 2018/0182548 | A1 * | 6/2018 | Park | H01G 4/30 |
| 2020/0402717 | A1 * | 12/2020 | Lee | H01G 4/224 |

FOREIGN PATENT DOCUMENTS

| | | | |
|---|---|---|---|
| JP | H08-162304 | A | 6/1996 |
| JP | 2008-227332 | A | 9/2008 |
| KR | 10-2014-0012493 | A | 2/2014 |

* cited by examiner

*Primary Examiner* — Arun Ramaswamy
(74) *Attorney, Agent, or Firm* — Morgan, Lewis & Bockius LLP

(57) ABSTRACT

A multilayer capacitor includes: a body including a capacitance region in which at least one first internal electrode and at least one second internal electrode are alternately stacked on each other, having at least one dielectric layer interposed therebetween in a first direction; and first and second external electrodes disposed on the body while being spaced apart from each other to be respectively connected to the at least one first internal electrode and the at least one second internal electrode. The body further includes a cover layer disposed to overlap the capacitance region in the first direction, and 1.11 or more is a value obtained by dividing a sum of respective major-axis lengths Lx of a plurality of crystal grains included in the cover layer by a sum of respective minor-axis lengths Sx of the plurality of crystal grains.

14 Claims, 11 Drawing Sheets

113a

113b

MULTILAYER CAPACITOR

CROSS-REFERENCE TO RELATED APPLICATION(S)

This application claims benefit of priority to Korean Patent Application No. 10-2021-0193710 filed on Dec. 31, 2021 in the Korean Intellectual Property Office, the disclosure of which is incorporated herein by reference in its entirety.

TECHNICAL FIELD

The present disclosure relates to a multilayer capacitor.

BACKGROUND

A multilayer capacitor has been widely used as a component of an electronic device such as a computer, a personal digital assistant (PDA), a mobile phone because the multilayer capacitor has a small size, implements a high capacitance and may be easily mounted, and has also been widely used as a component of an electric device (including a vehicle) because the multilayer capacitor has high reliability and high strength characteristic.

The multilayer capacitor may be smaller when used in the electronic device, and it may thus be important for the multilayer capacitor to have a higher capacitance relative to a volume thereof. Accordingly, it may be more important for a multilayer capacitor having a structure, advantageous for forming the higher capacitance relative to a volume thereof, to have improved strength or a reduced cracking rate.

When used in the electric device, the multilayer capacitor may be exposed to a harsh environment (e.g., high voltage, high temperature, possibility of external impact).

Accordingly, it may be more important for the multilayer capacitor to have the improved strength or the reduced cracking rate in order to ensure its reliability in the harsh environment.

SUMMARY

An aspect of the present disclosure may provide a multilayer capacitor.

According to an aspect of the present disclosure, a multilayer capacitor may include: a body including a capacitance region in which at least one first internal electrode and at least one second internal electrode are alternately stacked on each other, having at least one dielectric layer interposed therebetween in a first direction; and first and second external electrodes disposed on the body while being spaced apart from each other to be respectively connected to the at least one first internal electrode and the at least one second internal electrode. The body may further include a cover layer disposed to overlap the capacitance region in the first direction. 1.11 or more may be a value obtained by dividing a sum of respective major-axis lengths Lx of a plurality of crystal grains included in the cover layer by a sum of respective minor-axis lengths Sx of the plurality of crystal grains.

According to another aspect of the present disclosure, a multilayer capacitor may include: a body including a capacitance region in which at least one first internal electrode and at least one second internal electrode are alternately stacked on each other, having at least one dielectric layer interposed therebetween in a first direction; and first and second external electrodes disposed on the body while being spaced apart from each other to be respectively connected to the at least one first internal electrode and the at least one second internal electrode. The body may further include a cover layer disposed to overlap the capacitance region in the first direction. A value obtained by dividing a sum of respective major-axis lengths Lx of the plurality of crystal grains included in the cover layer by a sum of respective minor-axis lengths Sx of the plurality of crystal grains included in the cover layer may be greater than a value obtained by dividing a sum of respective major-axis lengths of a plurality of crystal grains included in the at least one dielectric layer by a sum of respective minor-axis lengths of the plurality of crystal grains included in the at least one dielectric layer.

According to another aspect of the present disclosure, a multilayer capacitor may include: a body including a capacitance region in which at least one first internal electrode and at least one second internal electrode are alternately stacked on each other, having at least one dielectric layer interposed therebetween in a first direction; and first and second external electrodes disposed on the body while being spaced apart from each other to be respectively connected to the at least one first internal electrode and the at least one second internal electrode. The body may further include a cover layer disposed to overlap the capacitance region in the first direction. A ratio of the number of grains having a shape closer to a plate than a sphere in one unit area of the cover layer to the number of grains having a shape closer to a sphere than a plate in the one unit area of the cover layer, may be greater than a ratio of the number of grains having a shape closer to a plate than a sphere in one unit area of the at least one dielectric layer to the number of grains having a shape closer to a sphere than a plate in the one unit area of the at least one dielectric layer.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
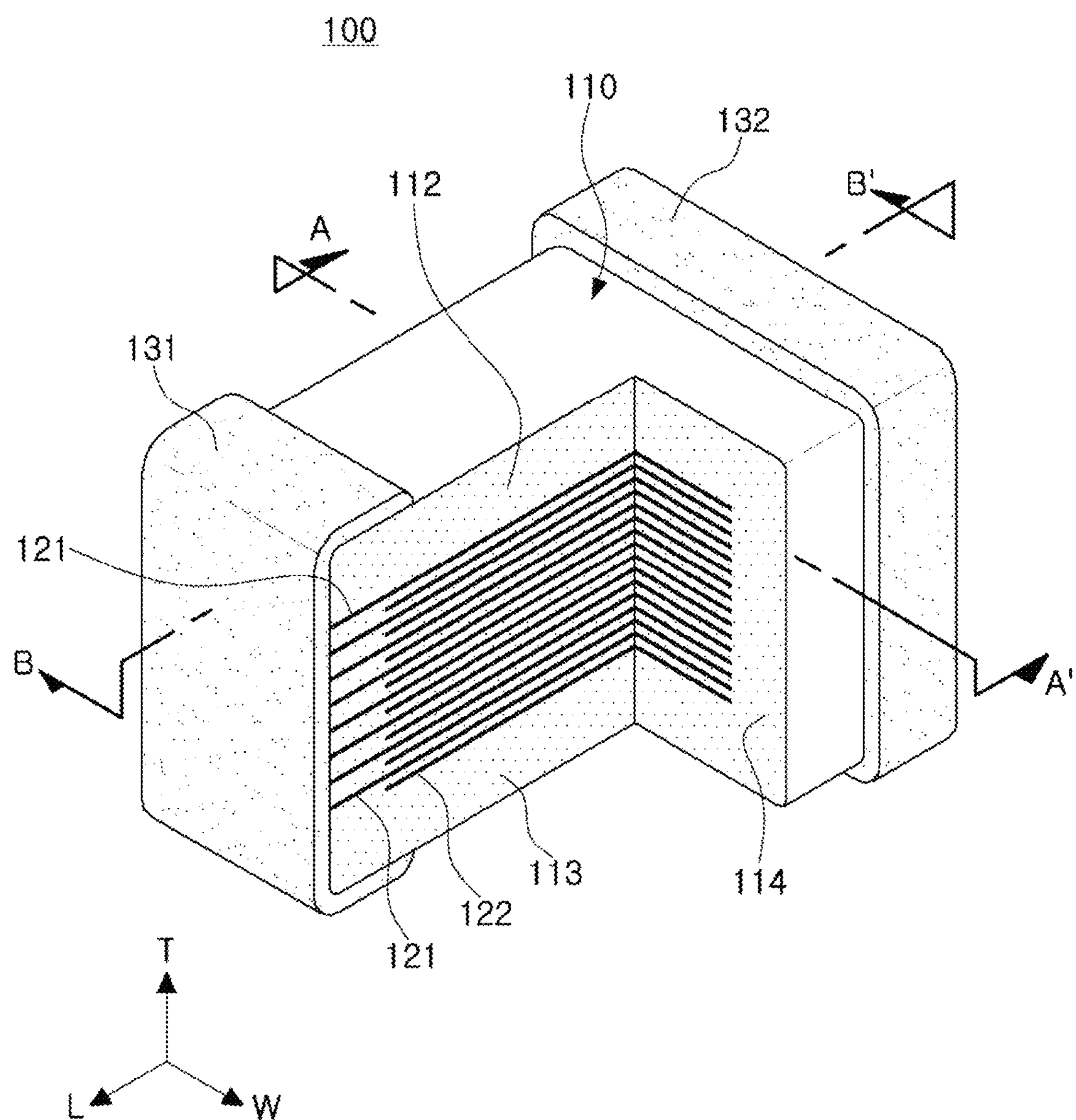
FIG. 1 is a perspective view illustrating a multilayer capacitor according to an exemplary embodiment of the present disclosure.

Hereinafter, exemplary embodiments of the present disclosure will now be described in detail with reference to the accompanying drawings.

In order to clearly describe exemplary embodiments of the present disclosure, directions of a hexahedron may be defined as follows: an L-direction, a W-direction and a T-direction in the drawings respectively refer to a length direction, a width direction and a thickness direction. Here, the thickness direction may refer to a stack direction (or first direction) in which dielectric layers are stacked.

Hereinafter, the description describes a multilayer capacitor according to an exemplary embodiment of the present disclosure, and in particular, a multi-layer ceramic capacitor (MLCC), and the present disclosure is not limited thereto.

Figure 2:
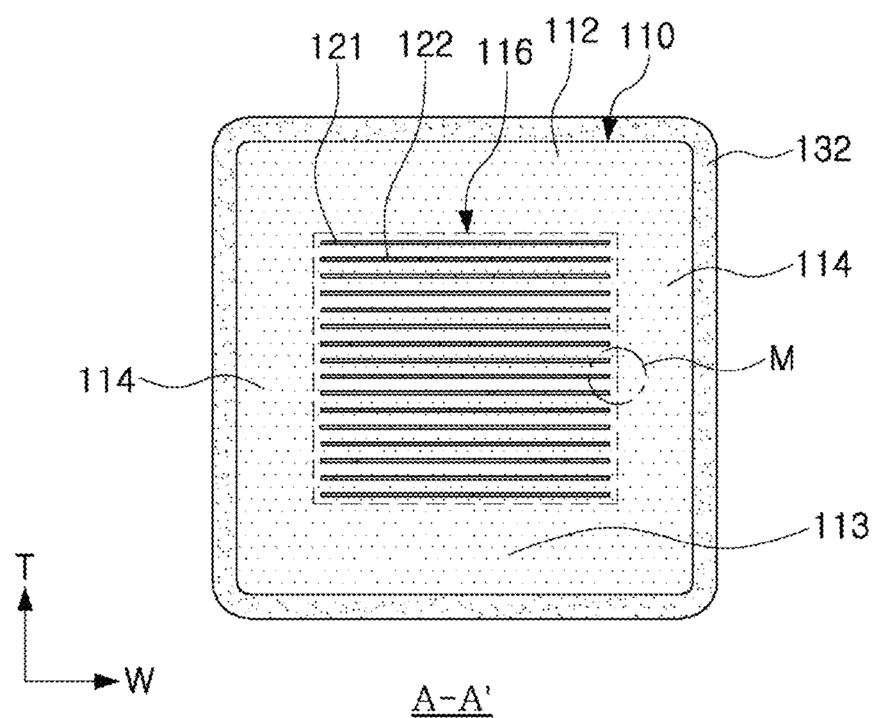
FIG. 2 is a cross-sectional view taken along line A-A' of FIG. 1.
Figure 3A:
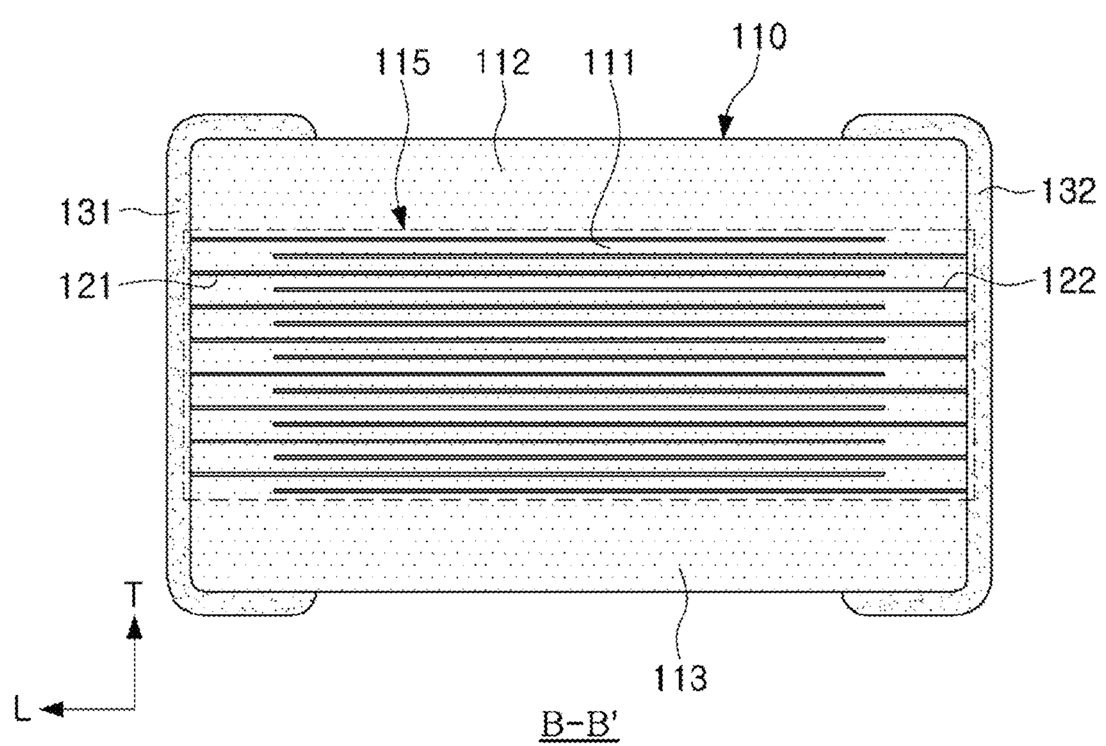
FIG. 3A is a cross-sectional view taken along line B-B' of FIG. 1.

FIG. 1 is a perspective view illustrating a multilayer capacitor according to an exemplary embodiment of the present disclosure, FIG. 2 is a cross-sectional view taken along line A-A' of FIG. 1, and FIG. 3A is a cross-sectional view taken along line B-B' of FIG. 1. FIG. 1 illustrates a multilayer capacitor 100 cut by about a 1/4 volume to show the inside of a body 110. However, the actual multilayer capacitor 100 may not be cut by about the 1/4 volume, and may have a shape approximately symmetrical with respect to each of the L-direction, the W direction and the T direction from its center.

Referring to FIGS. 1, 2 and 3A, the multilayer capacitor 100 according to an exemplary embodiment of the present disclosure may include the body 110, a first external electrode 131 and a second external electrode 132.

The body 110 may include a capacitance region in which at least one first internal electrode 121 and at least one second internal electrode 122 are alternately stacked on each other interposing at least one dielectric layer 111 therebetween in a first direction (e.g., T direction).

For example, the body 110 may be a ceramic body formed by sintering the capacitance region. Here, the at least one dielectric layer 111 disposed in the body 110 may be in a sintered state, and a boundary between the adjacent dielectric layers may be integrated to each other, thus making it difficult to confirm a boundary therebetween without using a scanning electron microscope (SEM).

For example, the body 110 may have a shape of a hexahedron having two side surfaces in the length direction (L-direction), two side surfaces in the width direction (W-direction) and two side surfaces in the thickness direction (T-direction), and this hexahedron may have edges/corners polished to each have a round shape. However, the shape and dimension of the body 110 and the stack number of the dielectric layers 111 may not be limited to those described in this exemplary embodiment.

The at least one dielectric layer 111 may have a thickness arbitrarily changed based on a capacitance design of the multilayer capacitor 100, and may include a ceramic powder having high dielectric constant, e.g., barium titanate ($BaTiO_3$) based powder. However, the present disclosure is not limited thereto. In addition, various ceramic additives (e.g., MgO, $Al_2O_3$, $SiO_2$ or ZnO), organic solvents, plasticizers, binders, dispersants or the like may be added to the ceramic powder based on a required specification of the multilayer capacitor 100.

An average particle diameter of the ceramic powder used to form the at least one dielectric layer 111 may not be particularly limited, may be adjusted based on the required specification of the multilayer capacitor 100 (e.g., miniaturization and/or high capacitance required for a capacitor for an electronic device, or high withstand voltage characteristic and/or strong strength required for a capacitor for an electric device), and may be adjusted to 400 nm or less for example.

For example, the at least one dielectric layer 111 may be formed by applying a slurry including the powder such as the barium titanate ($BaTiO_3$) or the like, to a carrier film and then drying the same to prepare a plurality of ceramic sheets. The ceramic sheets may be formed by mixing the ceramic powder, a binder and a solvent with one another to prepare the slurry and then manufacturing the slurry in a shape of the sheet having a thickness of several micrometers using a doctor blade method, and the present disclosure is limited thereto.

The at least one first internal electrode 121 and the at least one second internal electrode 122 may be formed as follows: conductive pastes each including a conductive metal are printed; arranged along the stack direction (e.g., T direction) of the dielectric layer to be exposed alternately from (or to be alternately in contact with or to alternately extend from) one side surface and the other side surface of the body 110 in the length direction (L-direction) of the body 110; and electrically insulated from each other by the dielectric layer 111 interposed therebetween.

For example, the at least one first internal electrode 121 and the at least one second internal electrode 122 may each be formed of a conductive paste for an internal electrode, having an average particle size of 0.1 to 0.2 μm, and including 40 to 50 wt % of conductive metal powder, and the present disclosure is limited thereto. The conductive paste may include single metal powder such as nickel (Ni), copper (Cu), palladium (Pd), silver (Ag), lead (Pb) or platinum (Pt), or an alloy thereof, and the present disclosure is limited thereto.

For example, the conductive paste for an internal electrode may be applied to the ceramic sheets using a printing method or the like, to form an internal electrode pattern. The printing method of the conductive paste may be a screen printing method, a gravure printing method or the like, and the present disclosure is not limited thereto. For example, two hundred or three hundred ceramic sheets on each of which the internal electrode pattern is printed may be stacked, pressed and sintered to manufacture the body 110.

A capacitance of the multilayer capacitor 100 may be proportional to an area in which the at least one first internal electrode 121 and the at least one second internal electrode 122 overlap each other in the stack direction (e.g., T direction), proportional to a total stack number of the at least one first internal electrode 121 and the at least one second internal electrode 122, and inversely proportional to a distance between the at least one first internal electrode 121 and the at least one second internal electrode 122. The distance between the internal electrodes may be substantially equal to each thickness of the at least one dielectric layer 111.

The multilayer capacitor 100 may have a higher capacitance compared to its thickness as the distance between the at least one first internal electrode 121 and the at least one second internal electrode 122 is smaller. On the other hand, a withstand voltage of the multilayer capacitor 100 may be higher as the distance between the internal electrodes is increased. Therefore, the distance between the internal electrodes may be adjusted based on the required specification of the multilayer capacitor 100 (e.g., miniaturization and/or high capacitance required for a capacitor for an electronic device, or high withstand voltage characteristic and/or strong strength required for a capacitor for an electric device). Each thickness of the at least one first internal electrode 121 and the at least one second internal electrode 122 may also be changed based on the distance between the internal electrodes.

For example, the multilayer capacitor 100 may be designed so that the distance between the at least one first internal electrode 121 and the at least one second internal electrode 122 are greater than twice the thickness of each electrode when required to have the high withstand voltage characteristic and/or strong strength. For example, the multilayer capacitor 100 may be designed so that each thickness of the at least one first internal electrode 121 and the at least one second internal electrode 122 is 0.4 μm or less and the total stack number thereof is 400 or more when required to have the miniature size and/or the high capacitance.

The first and second external electrodes 131 and 132 may be disposed on the body 110 while being spaced apart from each other to be respectively connected to the at least one first internal electrode 121 and the at least one second internal electrode 122.

For example, the first and second external electrodes 131 and 132 may each be formed using a method of dipping the external electrodes into a paste including a metal component, a method of printing the conductive paste, a sheet transfer method, a pad transfer method, a sputter plating method, an electrolytic plating method, etc. For example, the first and second external electrodes 131 and 132 may each include a fired layer formed by firing the paste and a plating layer formed on an outer surface of the fired layer, and may further include a conductive resin layer disposed between the fired layer and the plating layer. For example, the conductive resin layer may be formed as a thermosetting resin such as epoxy includes a conductive particle. The metal component may be a single component such as copper (Cu), nickel (Ni), palladium (Pd), platinum (Pt), gold (Au), silver (Ag), lead (Pb) or tin (Sn), or an alloy thereof, and the present disclosure is not limited thereto.

The multilayer capacitor 100 may be mounted or embedded in an external board (e.g., printed circuit board), and may be connected to at least one of the wiring, land, solder and bump of the external board through the first and second external electrodes 131 and 132 to be electrically connected to a circuit (e.g., integrated circuit or processor) electrically connected to the external board.

Referring to FIGS. 1, 2 and 3A, the body 110 may include an upper cover layer 112, a lower cover layer 113 and a core region 115, and the core region 115 may include a margin region 114 and a capacitance region 116.

The upper and lower cover layers 112 and 113 may be disposed to interpose the core region 115 therebetween in the first direction (e.g., T direction) and may each have a thickness greater than each thickness of the at least one dielectric layer 111. The upper cover layer 112 may provide an upper surface of the body 110, and the lower cover layer 113 may provide a lower surface of the body 110. A portion of the first or second external electrode 131 or 132 may be disposed on a portion of the upper or lower surface of the body 110.

Each of the upper and lower cover layers 112 and 113 may prevent an external environmental factor (e.g., moisture, plating solution or foreign material) from infiltrating into the core region 115, may protect the body 110 from external impact, and may also improve bending strength of the body 110.

For example, the upper and lower cover layers 112 and 113 may each include the same material or a different material (e.g., thermosetting resin such as epoxy resin) from the at least one dielectric layer 111.

The capacitance region 116 may include a portion between the at least one first internal electrode 121 and the at least one second internal electrode 122, thus forming the capacitance of the multilayer capacitor 100.

The capacitance region 116 may include the capacitance region in which the at least one first internal electrode 121 and the at least one second internal electrode 122 are alternately stacked on each other interposing the at least one dielectric layer 111 therebetween in the first direction (e.g., T direction), and may have the same size as the capacitance region.

The margin region 114 may be a portion between each boundary line M of the at least one first internal electrode 121 and the at least one second internal electrode 122 and the surface of the body 110.

The plurality of margin regions 114 may be disposed to interpose the capacitance region 116 therebetween in a second direction (e.g., W direction) perpendicular to the first direction (e.g., T direction). For example, the plurality of margin regions 114 may be formed in a manner similar to that of the at least one dielectric layer 111 (however, in a different stack direction).

The plurality of margin regions 114 may prevent the at least one first internal electrode 121 and the at least one second internal electrode 122 from being exposed from the surface of the body 110 in the second direction (e.g., W direction), and may thus prevent the external environmental factor (e.g., moisture, plating solution or foreign material) from infiltrating into the at least one first internal electrode 121 and the at least one second internal electrode 122 through the surface of the body in the second direction, thereby improving the reliability and lifespan of the multilayer capacitor 100. In addition, the at least one first internal electrode 121 and the at least one second internal electrode 122 may each be efficiently expanded in the second direction due to the plurality of margin regions 114, and the plurality of margin regions 114 may thus allow the overlapping area between the at least one first internal electrode 121 and the at least one second internal electrode 122 to be increased, thereby contributing to improvement in capacitance of the multilayer capacitor 100.

Figure 3B:
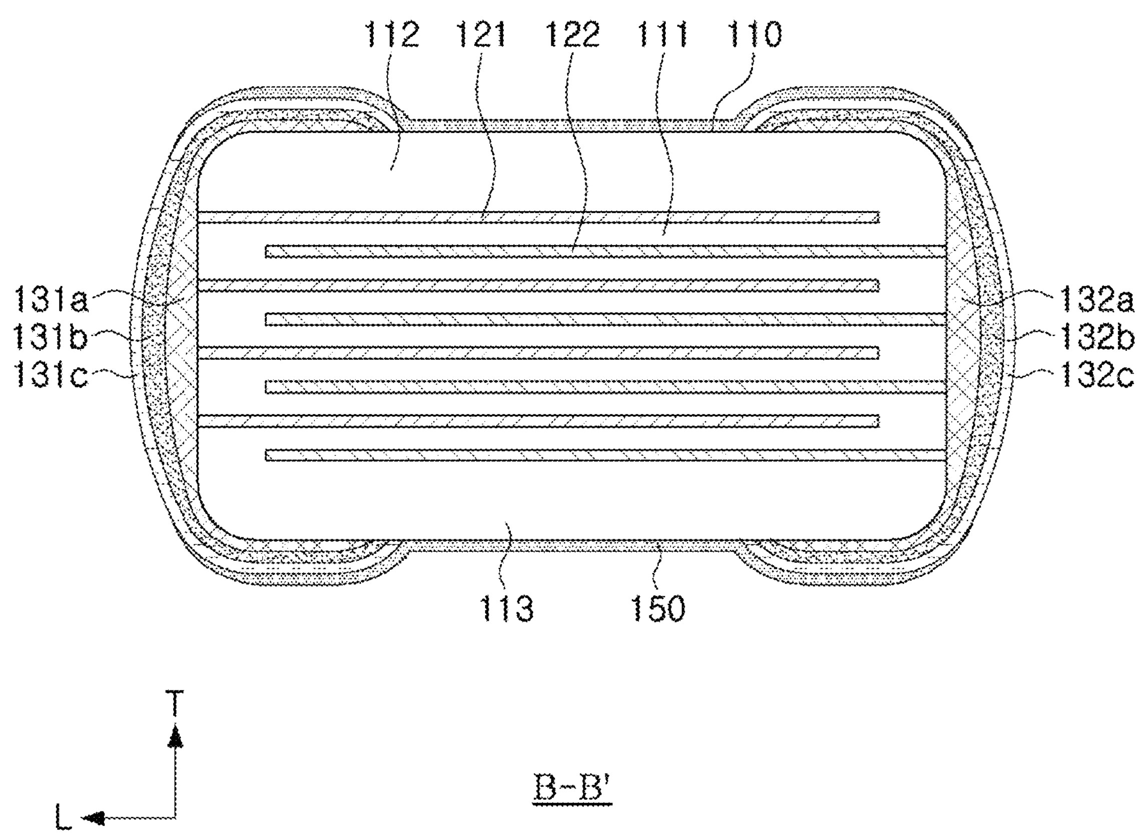
FIG. 3B is a cross-sectional view illustrating an external electrode of the multilayer capacitor according to an exemplary embodiment of the present disclosure.

FIG. 3B is a cross-sectional view illustrating the external electrode of the multilayer capacitor according to an exemplary embodiment of the present disclosure.

Referring to FIG. 3B, at least one of the first and second external electrodes 131 and 132 may include conductive resin layers 131*b* and 132*b* each including a resin, base electrode layers 131*a* and 132*a* respectively disposed between the conductive resin layers 131*b* and 132*b* and the body 110 and having higher conductivity than the conductive resin layers 131*b* and 132*b*, and plating layers 131*c* and 132*c* providing an outer surface of one of the first and second external electrodes 131 and 132. A portion of the surface (e.g., upper surface or lower surface) of the body 110 may be covered by the coating layer 150.

For example, the base electrode layers 131*a* and 132*a* may each be formed by dipping a portion of the body 110 in a paste including a metal material and/or glass frit, by sintering a portion of the body 110 in a state in which the paste is printed thereon or using a sheet transfer method or a pad transfer method. The metal material may be copper (Cu) to improve electrical connectivity to the body 110, and the present disclosure is not limited thereto. For example, the metal material may include at least one of copper (Cu), nickel (Ni), palladium (Pd), platinum (Pt), gold (Au), silver (Ag) and lead (Pb), and may be different based on the metal material of the internal electrode in the body 110.

For example, the first and second plating layers 131*c* and 132*c* may be formed by sputtering or electric deposition, and the present disclosure is not limited thereto. For example, the plating layers 131*c* and 132*c* may each include an inner plating layer including nickel (Ni) and an outer plating layer including tin (Sn).

For example, the conductive resin layers 131*b* and 132*b* may each include a thermosetting resin such as epoxy and a plurality of conductive particles (e.g., same material as the metal material of the base electrode layer). However, the conductive resin layers 131*b* and 132*b* may not be limited to including the thermosetting resin, and include bisphenol A resin, glycol epoxy resin, novolak epoxy resin, or resin which is liquid at a room temperature because of its low molecular weight among these derivatives.

The conductive resin layers 131*b* and 132*b* may improve durability of the first and second external electrodes 131 and 132 against the external impact or may prevent the external moisture or the plating solution from infiltrating into the body 110. Accordingly, the conductive resin layers 131*b* and 132*b* may reduce a speed at which the first and second external electrodes 131 and 132 have a reduced reliability even when exposed to a harsh environment.

The coating layer 150 may cover each outer surface of the upper and lower cover layers 112 and 113, and may further cover a portion of the first and second external electrodes 131 and 132 and/or an outer surface of the side margin based on a design of the capacitor. For example, the coating layer 150 may include an organic/inorganic compound including Silicon (Si) to improve a moisture resistance of the body 110, and may include an organic/inorganic substance including fluorine (F) and a polymer component. For example, the coating layer 150 may be implemented with a silane coupling agent or silicone-resin to have water repellency.

Figure 4:
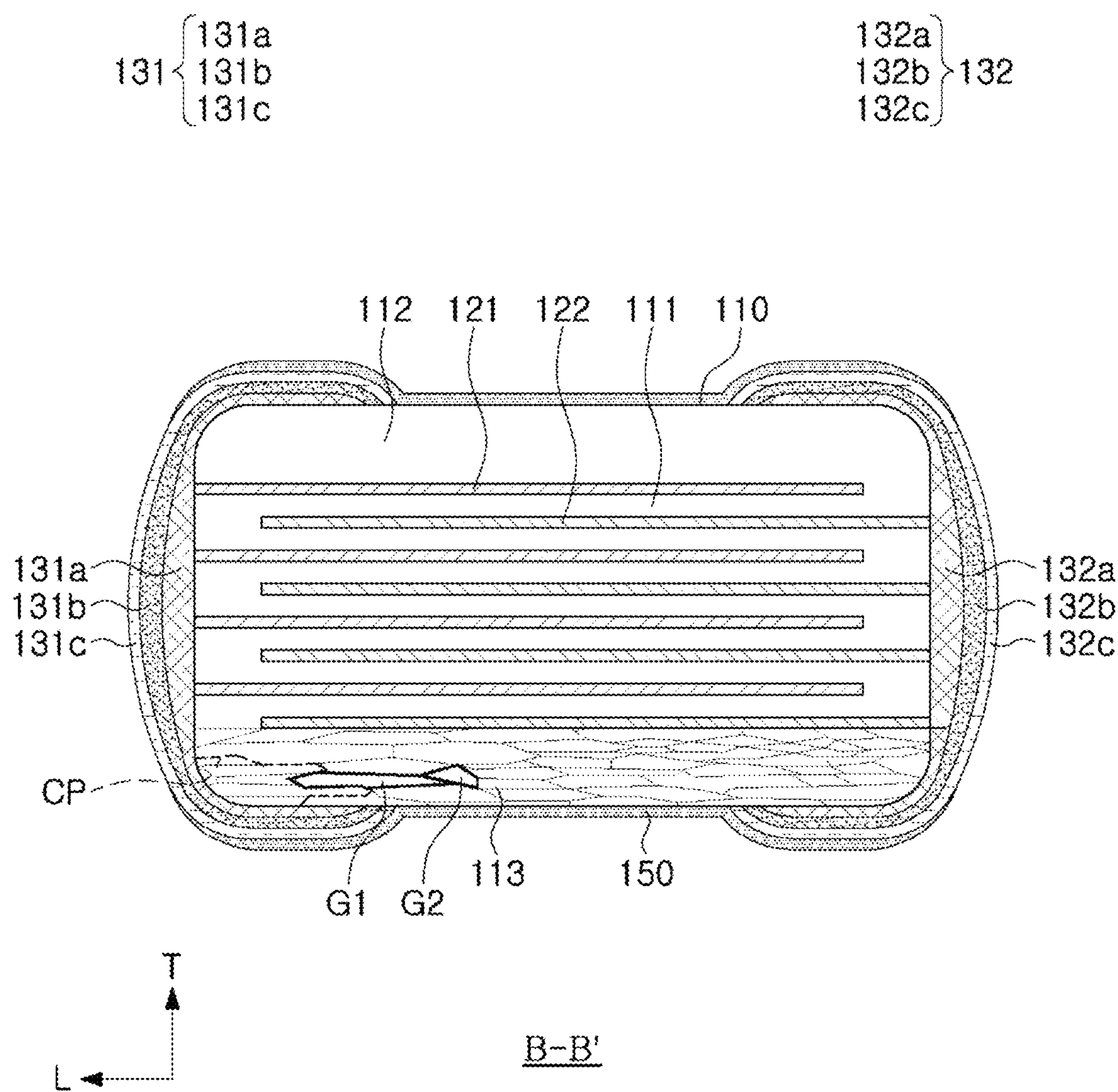
FIG. 4 is a cross-sectional view illustrating crystal grains of a cover layer of the multilayer capacitor according to an exemplary embodiment of the present disclosure and a crack path bypassed by the crystal grains.
Figure 7A:
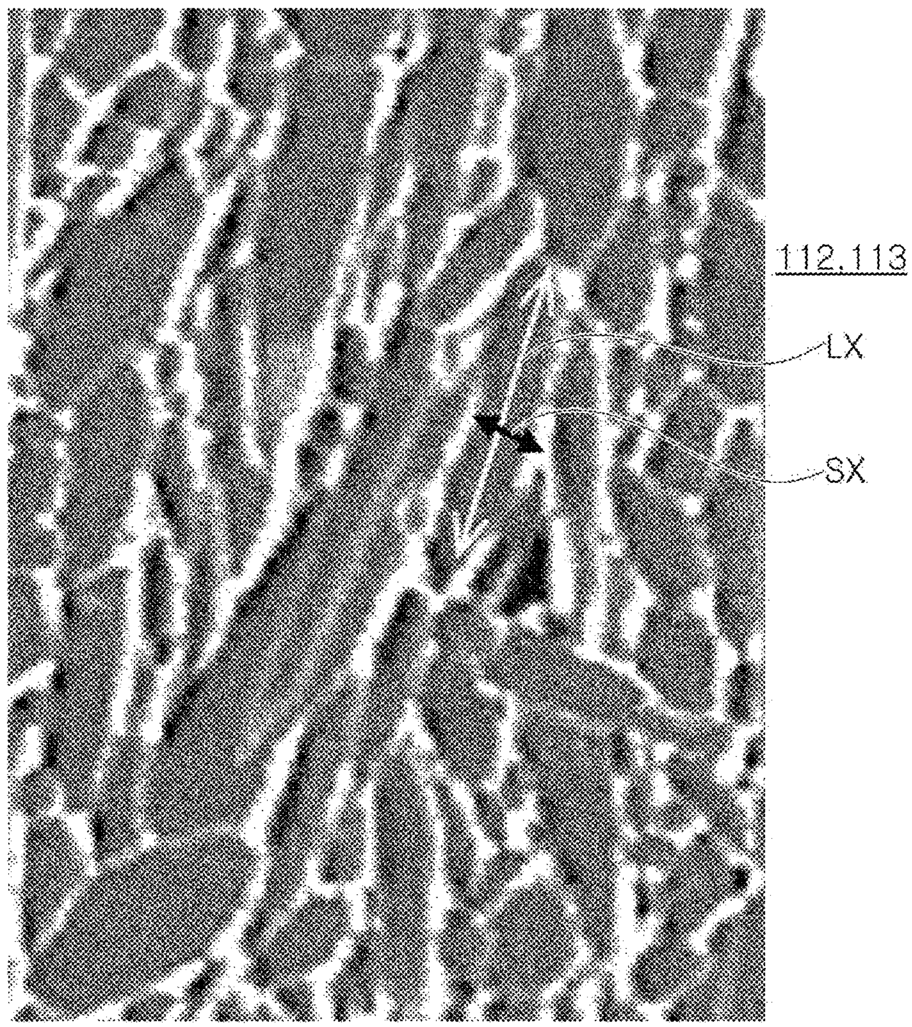
FIGS. 7A and 7B are views respectively illustrating the major-axis length and minor-axis length of the plurality of first crystal grains included in the multilayer capacitor according to an exemplary embodiment of the present disclosure.
Figure 7B:
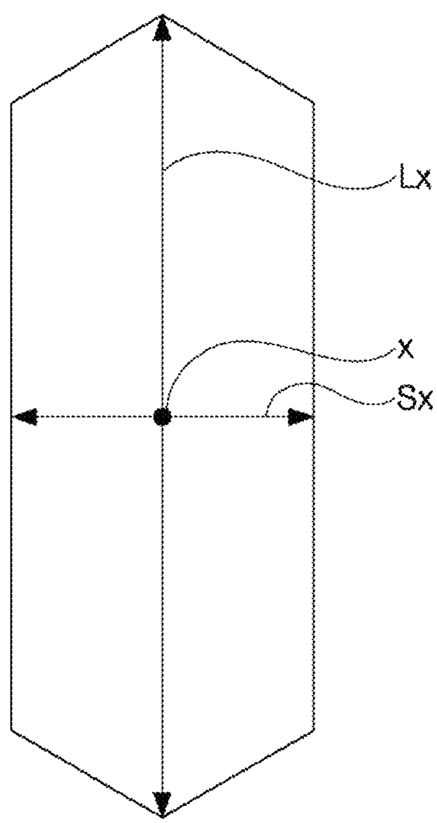
Figure 7C:
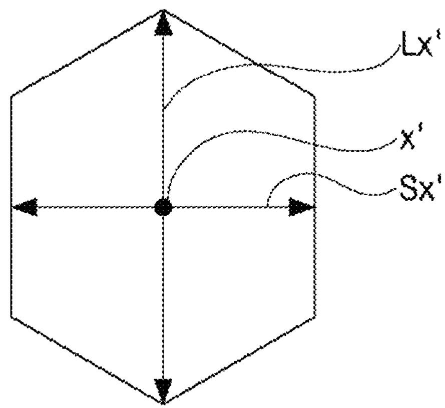
FIG. 7C is a view illustrating the major-axis length and minor-axis length of the plurality of second crystal grains included in the multilayer capacitor according to an exemplary embodiment of the present disclosure.

FIG. 4 is a cross-sectional view illustrating crystal grains of the cover layer of the multilayer capacitor according to an exemplary embodiment of the present disclosure and a crack path bypassed by the crystal grains, FIGS. 7A and 7B are views respectively illustrating the major-axis length and minor-axis length of a plurality of first crystal grains included in the multilayer capacitor according to an exemplary embodiment of the present disclosure, and FIG. 7C is a view illustrating the major-axis length and minor-axis length of a plurality of second crystal grains included in the multilayer capacitor according to an exemplary embodiment of the present disclosure.

Referring to FIG. 4, the cover layer of the multilayer capacitor according to an exemplary embodiment of the present disclosure may be at least one of the upper cover layer 112 and the lower cover layer 113, and may include a plurality of first crystal grains G1 and/or a plurality of second crystal grains G2.

Referring to FIGS. 7A and 7B, each of the plurality of first crystal grains G1 may have a major-axis length Lx of a longest axis passing through a center "x" of each of the plurality of first crystal grains G1, and a minor-axis length Sx of a shortest axis passing through the center "x". A direction of the major-axis length Lx and a direction of the minor-axis length Sx may be perpendicular to each other, and the present disclosure is not limited thereto.

Referring to FIG. 7C, each of the plurality of second crystal grains G2 may have a major-axis length Lx' of a longest axis passing through a center x' of each of the plurality of second crystal grains G2, and a minor-axis length Sx' of a shortest axis passing through the center x'. A direction of the major-axis length Lx' and a direction of the minor-axis length Sx' may be perpendicular to each other, and the present disclosure is not limited thereto.

Referring to FIGS. 7A through 7C, a value obtained by dividing a sum of the respective major-axis lengths Lx of the plurality of first crystal grains G1 by a sum of the respective minor-axis lengths Sx may be greater than a value obtained by dividing the sum of the respective major-axis lengths Lx' of the plurality of second crystal grains G2 by the sum of the respective minor-axis lengths Sx'. Accordingly, each of the plurality of first crystal grains G1 may have a shape relatively close to a plate, and each of the plurality of second crystal grains G2 may have a shape relatively close to a sphere. The major-axis length Lx' and minor-axis length Sx' of each of the plurality of second crystal grains G2 may be the same as each other, and the present disclosure is not limited thereto.

For example, the major-axis length Lx of the plurality of first crystal grains G1 may be longer than the minor-axis length Sx as a strong shear stress is applied to a surface of a green sheet formed by injection-molding the slurry including powder of at least one material (e.g., barium titanate) of the upper cover layer 112 and the lower cover layer 113. For example, the strong shear stress may be applied to the green sheet in a state in which the green sheet emerges from a discharge portion of an injection molding machine.

For example, the strong shear stress may be applied to the green sheet in a rolling process of passing the green sheet between a plurality of rolls. Accordingly, the major-axis length Lx of the plurality of first crystal grains G1 may be longer than the minor-axis length Sx even without injection-molding the green sheet. Both the injection molding and the rolling process may proceed based on the design of the capacitor.

For example, even without the injection molding or the rolling process, the major-axis length Lx of the plurality of first crystal grains G1 may be longer than the minor-axis length Sx by adding an additive such as bismuth to the powder or the slurry in a process of forming the green sheet or a subsequent process (e.g., process of compressing the multilayer capacitor).

Whether to use the injection molding, the rolling process and the addition of bismuth may depend on how large the value each obtained by dividing the sum of the respective major-axis lengths Lx of the plurality of first crystal grains G1 by the sum of the respective minor-axis lengths Sx is required, how close the direction of the major-axis length Lx of each of the plurality of first crystal grains G1 needs to be oriented to the L-direction, how strong the strength required for the multilayer capacitor 100 is, or the thickness or material of the upper cover layer 112 and/or the lower cover layer 113.

For example, the plurality of second crystal grains G2 may be formed using less or none of the injection molding, the rolling processes and the addition of bismuth, when compared to the plurality of first crystal grains G1. For example, the structure in which the plurality of first crystal grains G1 and the plurality of second crystal grains G2 are mixed with each other may be implemented by forming the green sheet in a state in which the first and second powders (or slurries) having different applied shear stresses or different addition amounts of additives such as bismuth are mixed with each other.

Referring to FIG. 4, a crack path CP may be formed along an interface between the plurality of first crystal grains G1 and/or the plurality of second crystal grains G2. A point where the crack path CP starts may be an upper surface of the upper cover layer 112 and/or a lower surface of the lower cover layer 113.

When a unit force (e.g., external force, internal stress) is applied to the upper cover layer 112 and/or the lower cover layer 113, the longer the crack path CP, the lower cracking rate of each of the upper cover layer 112 and/or the lower cover layer 113.

As the value obtained by dividing the sum of the respective major-axis lengths Lx of the plurality of first crystal grains G1 by the sum of the respective minor-axis lengths Sx is larger, the crack path CP may be bypassed more, and thus have a longer length.

Table 1 below shows the cracking rate and short-circuit rate of twelve multilayer capacitor samples each having different (Σ Lx/Σ Sx) which is the value obtained by dividing the sum of the respective major-axis lengths Lx or Lx' of the plurality of first and second crystal grains G1 and G2 by the sum of the respective minor-axis lengths Sx or Sx', and/or different (G1/(G1+G2)) which is the weight ratio of the plurality of first crystal grains G1 to the total weight of the plurality of first and second crystal grains G1 and G2. A short-circuit path is more likely to be formed in a cracked portion rather than a non-cracked portion, and there may thus be a correlation between the short-circuit rate and the cracking rate.

TABLE 1

| Sample no. | G1/ (G1 + G2) | Σ Lx/ Σ Sx | Cracking rate | Short-circuit rate |
|---|---|---|---|---|
| 1 | 0.0% | 1 | 47.5% | 47.5% |
| 2 | 6.7% | 1.05 | 40.0% | 32.5% |
| 3 | 14.4% | 1.11 | 17.5% | 7.5% |
| 4 | 19.4% | 1.15 | 12.5% | 0.0% |
| 5 | 22.4% | 1.18 | 5.0% | 0.0% |
| 6 | 25.1% | 1.21 | 0.0% | 0.0% |
| 7 | 41.9% | 1.43 | 0.0% | 0.0% |
| 8 | 62.7% | 1.88 | 0.0% | 0.0% |
| 9 | 79.3% | 2.56 | 0.0% | 0.0% |
| 10 | 84.7% | 2.85 | 7.5% | 0.0% |
| 11 | 86.0% | 3.00 | 20.0% | 5.0% |
| 12 | 88.5% | 3.18 | 27.5% | 15.0% |

Referring to Samples 1 and 2 of Table 1, the cracking rate may be 40.0% or more, and the short-circuit rate may be 32.5% or more when 1.05 or less is (Σ Lx/Σ Sx) which is the value obtained by dividing the sum of the respective major-axis lengths Lx or Lx' of the plurality of first and second crystal grains G1 and G2 by the sum of the respective minor-axis lengths Sx or Sx'.

Referring to Samples 3 to 12 of Table 1, the cracking rate may be 27.5% or less, and the short-circuit rate may be 15.0% or less when 1.11 or more is (Σ Lx/Σ Sx) which is the value obtained by dividing the sum of the respective major-axis lengths Lx or Lx' of the plurality of first and second crystal grains G1 and G2 by the sum of the respective minor-axis lengths Sx or Sx'.

A difference may be small in the sums (Σ Lx/Σ Sx) of Samples 2 and 3 in Table 1. Accordingly, a range in which (Σ Lx/Σ Sx) has a vale between 1.05 and 1.11 may include a critical point in which a change rate of the cracking rate and the short-circuit rate is large based on a change in (Σ Lx/Σ Sx).

Therefore, the cover layer of the multilayer capacitor according to an exemplary embodiment of the present disclosure may have a structure in which 1.11 or more is (Σ Lx/Σ Sx) which is the value each obtained by dividing the sum of the respective major-axis lengths Lx or Lx' of the plurality of first and second crystal grains G1 and G2 by the sum of the respective minor-axis lengths Sx or Sx', thereby effectively reducing the cracking rate and the short-circuit rate.

Referring to Samples 1, 2, 3, 11 and 12 in Table 1, the short-circuit rate may be higher than 0% when (Σ Lx/Σ Sx) is less than 1.15 or greater than 2.85.

Referring to Samples 4 to 10 of Table 1, the short-circuit rate may be 0% when (Σ Lx/Σ Sx) is 1.15 or more or 2.85 or less. Even when the cracking rate is higher than 0%, the crack may be so small that it is not easy to use such a small crack in the short-circuit path. Accordingly, a multilayer capacitor having the short-circuit rate of 0% may be considered to have high reliability Therefore, the cover layer of the multilayer capacitor according to an exemplary embodiment of the present disclosure may have a structure in which 1.15 or more or 2.85 or less is (Σ Lx/Σ Sx) which is the value obtained by dividing the sum of the respective major-axis lengths Lx or Lx' of the plurality of first and second crystal grains G1 and G2 by the sum of the respective minor-axis lengths Sx or Sx', and may thus have the high reliability.

Referring to Samples 4 to 10 of Table 1, the short-circuit rate may be 0% when the weight ratio (G1/(G1+G2)) is 19.4% or more and 84.7% or less. Therefore, the cover layer of the multilayer capacitor according to an exemplary embodiment of the present disclosure may have a structure in which 19.4% or more and 84.7% or less is the weight ratio (G1/(G1+G2)) of the plurality of first crystal grains G1 to the total weight of the plurality of first and second crystal grains G1 and G2, and may thus have the high reliability.

For example, the major-axis length Lx or Lx' and the minor-axis length Sx or Sx' may each be measured as an average thickness of each of portions corresponding to the major length Lx or Lx' and the minor length Sx or Sx', based on a length-thickness (LT) cross section of the body, exposed after cutting or grinding the body 110 in the LT plane including a center of the body 110 (i.e., in the W− direction). For example, the LT cross section may be used in analysis using at least one of the transmission electron microscopy (TEM), the atomic force microscope (AFM)), the scanning electron microscope (SEM), the optical microscope and the surface profiler, and a thickness a1, a2, T1 or T2 may be measured by a visual inspection or image processing (e.g., identifying a pixel based on the color or brightness of the pixel, filtering a pixel value for efficient pixel identification, integrating a distance between the identified pixels) on an image obtained from the above analysis.

For example, the plurality of crystal grains used for measuring the sum of the respective major-axis lengths Lx or the sum of the respective minor-axis lengths Sx may be the plurality of crystal grains closest to a center of one of the upper cover layer 112 and the lower cover layer 113, based on a cross section (LT cross section) of the body, including the center, and formed by a direction (e.g., L-direction) in which the first and second external electrodes 131 and 132 face each other and a first direction (e.g., T-direction).

For example, among the at least four crystal grains closest to the center of the one of the upper cover layer 112 and the lower cover layer 113, based on the LT cross-section, the plurality of first crystal grains G1 in a first range in which (Lx/Sx) is large and the plurality of second crystal grains G2 in a second range in which (Lx'/Sx') is small may be classified into each other. (Lx/Sx) of the plurality of first crystal grains G1 and (Lx'/Sx') of the plurality of second crystal grains G2 may be respectively calculated or integrated and calculated. For example, $(\Sigma(Lx+Lx')/\Sigma(Sx+Sx'))$ may be 1.15 or more and 2.85 or less.

For example, 1.11 or more may be $(\Sigma(Lx+Lx')/\Sigma(Sx+Sx'))$ of the cover layer of the multilayer capacitor according to an exemplary embodiment of the present disclosure, each of the plurality of second crystal grains G2 may have a spherical shape, and the number of the plurality of first crystal grains G1 and the number of the plurality of second crystal grains G2 may be the same as each other. Accordingly, $(\Sigma Lx'/\Sigma Sx')$ may be 1, and $(\Sigma Lx/\Sigma Sx)$ may be 1.22 or more. 1.22 may be a criterion for determining the first range, and 1 may be a criterion for determining the second range.

As such, when $(\Sigma Lx/\Sigma Sx)$ is 1.22 times or more of $(\Sigma Lx'/\Sigma Sx')$, the plurality of first crystal grains G1 having a large $(\Sigma Lx/\Sigma Sx)$ and the plurality of second crystal grains G2 having a small $(\Sigma Lx'/\Sigma Sx')$ may be efficiently disposed in a gap between each other. Therefore, the plurality of first crystal grains G1 and the plurality of second crystal grains G2 may be more densely disposed in at least one of the upper cover layer 112 and the lower cover layer 113. The more densely the crystal grains are disposed in at least one of the upper cover layer 112 and the lower cover layer 113, the lower the cracking rate in the at least one of the upper cover layer 112 and the lower cover layer 113.

For example, $(\Sigma Lx/\Sigma Sx)$ which is the value obtained by dividing, by the sum of Sx, the sum of Lx of the plurality of first crystal grains G1 each having a relatively high major-axis length to minor-axis length ratio among the at least four crystal grains included in the cover layer may be 1.3 times or more than $(\Sigma Lx'/\Sigma Sx')$ which is the value obtained by dividing, by the sum of Sx', the sum of Lx' of the plurality of second crystal grains G2 each having a relatively low major-axis length to minor-axis length ratio among the at least four crystal grains included in the cover layer.

In addition, it is also possible to identify the direction of the major-axis length Lx of the plurality of first crystal grains G1 and the direction of the minor-axis length Sx of the plurality of first crystal grains G1 from each other, based on the LT cross section of the body. For example, among the Lx direction and the Sx direction, the Lx direction may be closer to the direction (e.g., the L-direction) in which the first and second external electrodes 131 and 132 face each other than the first direction (e.g., T direction), and the Sx direction may be closer to the first direction (e.g., T direction) than the direction in which the first and second external electrodes 131 and 132 face each other (e.g., L-direction). In one example, among the Lx direction and the Sx direction, the Lx direction may have a smaller inclination angle with respect to the direction (e.g., the L-direction) in which the first and second external electrodes 131 and 132 face each other than an inclination angle with respect to the first direction (e.g., T direction), and the Sx direction may have a smaller inclination angle with respect to the first direction (e.g., T direction) than an inclination angle with respect to the direction (e.g., the L-direction) in which the first and second external electrodes 131 and 132 face each other. Accordingly, the crack path CP may be bypassed more, and the cracking rate of the upper cover layer 112 and/or the lower cover layer 113 may thus be further reduced.

Figure 5A:
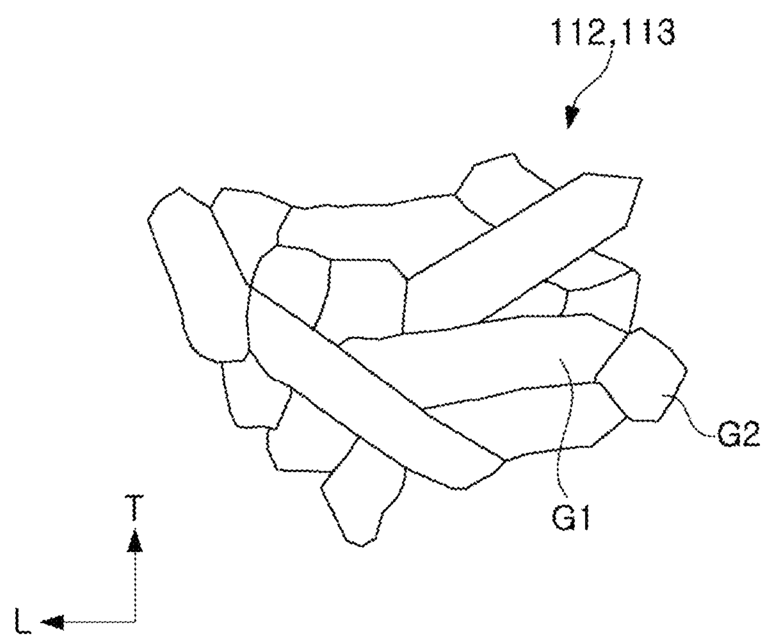
FIG. 5A is a view illustrating a structure of the cover layer of the multilayer capacitor according to an exemplary embodiment of the present disclosure, in which a plurality of first crystal grains and a plurality of second crystal grains are mixed with each other.
Figures 5B, 5C:
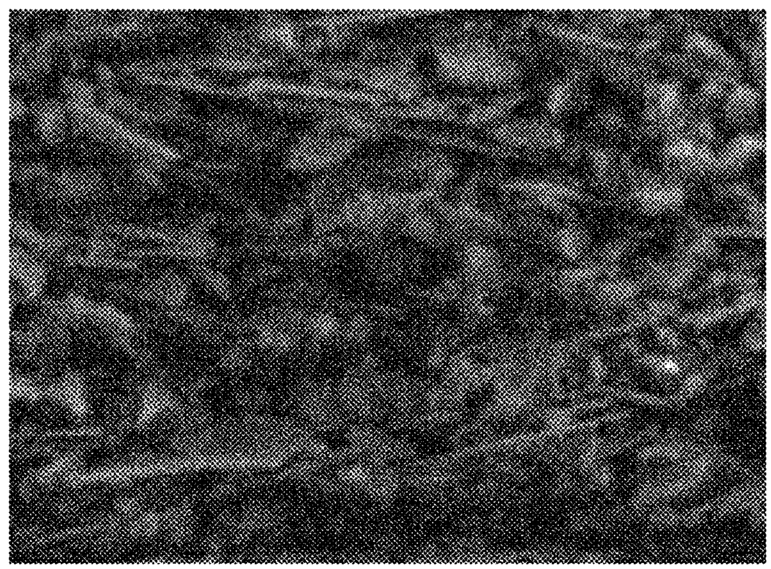
FIG. 5B is a photograph illustrating the structure of the cover layer of the multilayer capacitor according to an exemplary embodiment of the present disclosure, in which the plurality of first crystal grains and the plurality of second crystal grains are mixed with each other.
FIG. 5C is a photograph illustrating a structure of the cover layer of the multilayer capacitor according to an exemplary embodiment of the present disclosure, the cover layer including only the plurality of first crystal grains.

FIG. 5A is a view illustrating a structure of the cover layer of the multilayer capacitor according to an exemplary embodiment of the present disclosure, in which a plurality of first crystal grains and a plurality of second crystal grains are mixed with each other, FIG. 5B is a photograph illustrating the structure of the cover layer of the multilayer capacitor according to an exemplary embodiment of the present disclosure, in which the plurality of first crystal grains and the plurality of second crystal grains are mixed with each other, and FIG. 5C is a photograph illustrating a structure of the cover layer of the multilayer capacitor according to an exemplary embodiment of the present disclosure, the cover layer including only the plurality of first crystal grains.

Referring to FIGS. 5A and 5B, the plurality of first crystal grains G1 included in the upper cover layer and/or the lower cover layer 113*a* of the multilayer capacitor according to an exemplary embodiment of the present disclosure may each have the plate shape, and the plurality of second crystal grains G2 may each have the spherical shape.

The shape close to the plate may include a needle shape, and the needle shape may also be a shape in which the major-axis length is longer than the minor-axis length. The plate shape may be a shape in which a length of the cover layer in a direction perpendicular to a plane formed by the Lx direction and the Sx direction of plurality of crystal grains may be longer than Sx.

Compared to the needle shape, the plate shape may allow the crack path to be bypassed more in the upper cover layer and/or the lower cover layer 113*a*, and the cracking rate of the upper cover layer and/or the lower cover layer 113*a* may thus be more efficiently reduced.

Referring to FIG. 5C, the upper cover layer and/or lower cover layer 113*b* of the multilayer capacitor according to an exemplary embodiment of the present disclosure may include the plurality of first crystal grains G1 and may not include the plurality of second crystal grains. That is, in the present disclosure, the structure of the upper cover layer and/or the lower cover layer 113*b* are/is not limited to the structure in which the plurality of first crystal grains having the shape close to a plate and the plurality of second crystal grains having the shape close to a sphere are mixed with each other.

Figure 6A:
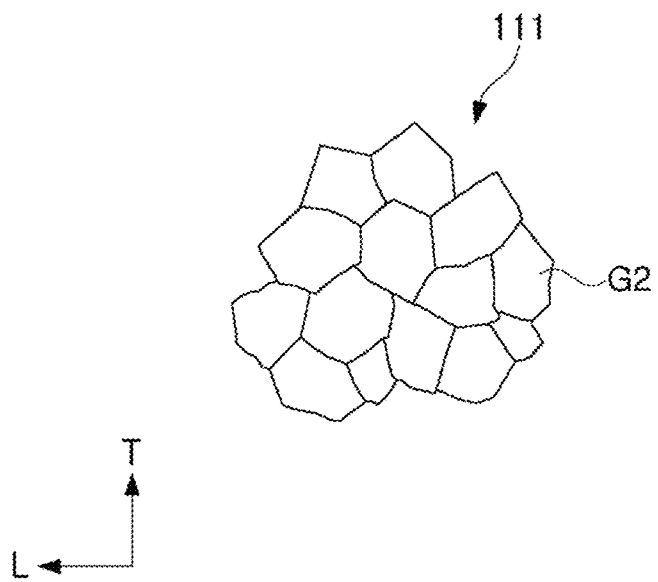
FIG. 6A is a view illustrating a plurality of crystal grains included in at least one dielectric layer of the multilayer capacitor according to an exemplary embodiment of the present disclosure.
Figure 6B:
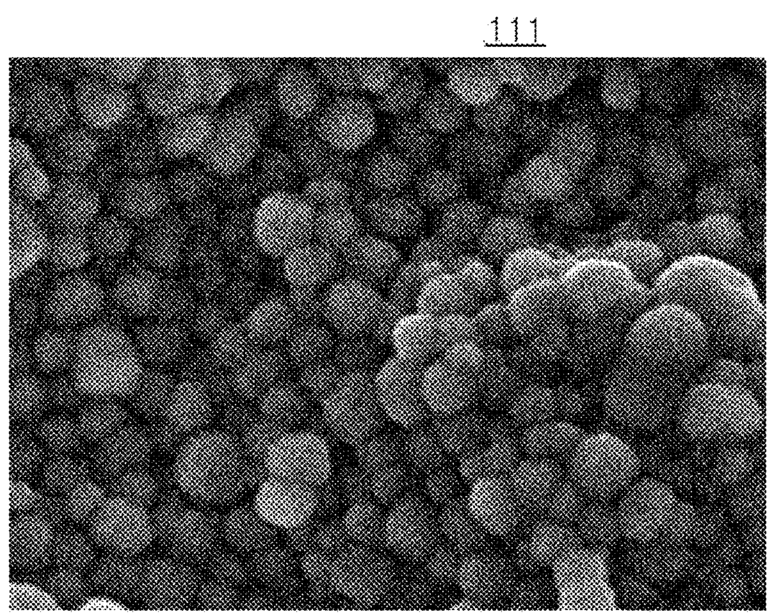
FIG. 6B is a photograph illustrating the plurality of crystal grains included in the at least one dielectric layer of the multilayer capacitor according to an exemplary embodiment of the present disclosure.

FIG. 6A is a view illustrating a plurality of crystal grains included in at least one dielectric layer of the multilayer capacitor according to an exemplary embodiment of the present disclosure, and FIG. 6B is a photograph illustrating the plurality of crystal grains included in the at least one dielectric layer of the multilayer capacitor according to an exemplary embodiment of the present disclosure.

Referring to FIGS. 6A and 6B, the plurality of crystal grains G2 included in the at least one dielectric layer 111 may have the spherical shape. Accordingly, the value obtained by dividing, by the sum of Sx, the sum of Lx of the plurality of crystal grains included in the upper cover layer and/or the lower cover layer may be greater than a value obtained by dividing, by the sum of the respective minor-axis lengths, the sum of the respective major-axis lengths of the plurality of crystal grains included in the at least one dielectric layer 111. In one example, a ratio of the number of crystal grains having a shape closer to a plate than a sphere in one unit area of the cover layer 112 or 113 to the number of grains having a shape closer to a sphere than a plate in the one unit area of the cover layer 112 or 113, may be greater than a ratio of the number of crystal grains having a shape closer to a plate than a sphere in one unit area of the at least one dielectric layer 111 to the number of grains having a shape closer to a sphere than a plate in the one unit area of the at least one dielectric layer 111.

For example, the plurality of crystal grains included in the at least one dielectric layer 111 may be the plurality of crystal grains closest to the center in the dielectric layer which is closest to the center of the body among the at least one dielectric layers 111.

For example, a volume of each of the plurality of first crystal grains having the shape close to a plate may be greater than a volume of each of the plurality of crystal grains having the shape close to a sphere. Accordingly, the volume of each of the plurality of crystal grains included in the upper cover layer and/or the lower cover layer having a high ratio of the crystal grain having a shape close to a plate may be greater than the volume of each of the plurality of crystal grains included in the at least one dielectric layer 111.

Figure 8:
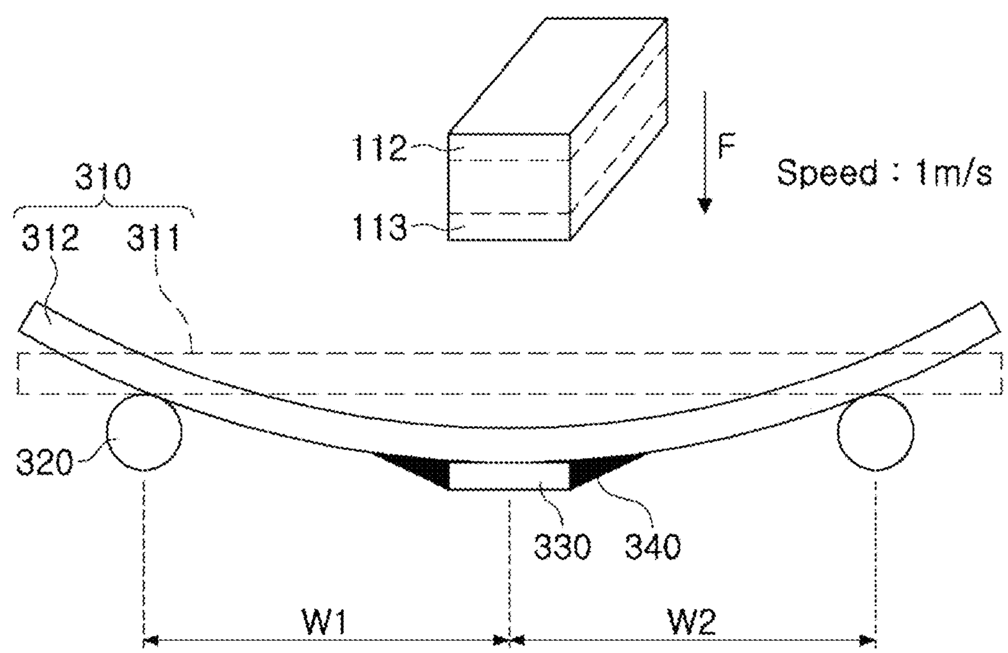
FIG. 8 is a view illustrating a process of measuring a cracking rate of the multilayer capacitor according to an exemplary embodiment of the present disclosure.

FIG. 8 is a view illustrating a process of measuring the cracking rate of the multilayer capacitor according to an exemplary embodiment of the present disclosure.

Referring to FIG. 8, the body including the upper cover layer 112 and the lower cover layer 113 may be moved toward a measurement plate 310 at a predetermined speed (e.g., 1 m/s) by an external force F. The measurement plate 310 may be appropriately selected to have one of a first non-bent state 311 and a second bent state 312, may be supported by a support 320, and damped by a damper 330. The damper 330 may be adhered to the measurement plate 310 using a bonding unit 340.

Whether the crack occurs in the upper cover layer 112 and/or the lower cover layer 113 after the collision of the body may be recorded cumulatively for each sample, and the cracking rate may be calculated based on the cumulative recording results.

As set forth above, the multilayer capacitor according to an exemplary embodiment of the present disclosure may efficiently obtain the stronger strength or the reduced cracking rate.

While the exemplary embodiments have been shown and described above, it will be apparent to those skilled in the art that modifications and variations could be made without departing from the scope of the present disclosure as defined by the appended claims.

What is claimed is:

1. A multilayer capacitor comprising:

a body including a capacitance region in which at least one first internal electrode and at least one second internal electrode are alternately stacked on each other, having at least one dielectric layer interposed therebetween in a first direction; and first and second external electrodes disposed on the body while being spaced apart from each other to be respectively connected to the at least one first internal electrode and the at least one second internal electrode, wherein the body further includes a cover layer disposed to overlap the capacitance region in the first direction, the cover layer includes an upper cover layer providing an upper surface of the body and a lower cover layer providing a lower surface of the body, a portion of the first or second external electrode is disposed on a portion of the upper or lower surface of the body, 1.15 or more is a value obtained by dividing a sum of respective major-axis lengths Lx of a plurality of crystal grains included in the cover layer by a sum of respective minor-axis lengths Sx of the plurality of crystal grains, the sum of Lx is the sum of the major-axis lengths of the plurality of crystal grains closest to a center of one of the upper cover layer and the lower cover layer, based on a cross section of the body, including the center and formed by a second direction in which the first and second external electrodes face each other and the first direction, and the sum of Sx is the sum of the minor-axis lengths of the plurality of crystal grains closest to the center, based on the cross section.

2. The multilayer capacitor of claim 1, wherein the value is 1.15 or more and 2.85 or less.

3. The multilayer capacitor of claim 1, wherein among a Lx direction and a Sx direction, the Lx direction has a smaller inclination angle with respect to a second direction in which the first and second external electrodes face each other than an inclination angle with respect to the first direction, and among the Lx direction and the Sx direction, the Sx direction has a smaller inclination angle with respect to the first direction than an inclination angle with respect to the second direction.

4. The multilayer capacitor of claim 1, wherein a length of the plurality of crystal grains of the cover layer in a direction perpendicular to a plane formed by the Lx direction and Sx direction is longer than Sx.

5. The multilayer capacitor of claim 1, wherein the cover layer includes a barium titanate ($BaTiO_3$)-based ceramic material, and has a thickness greater than a thickness of one of the at least one dielectric layer.

6. The multilayer capacitor of claim 1, wherein among at least four crystal grains included in the cover layer, a value obtained by dividing, by a sum of Sx, a sum of Lx of a plurality of first crystal grains each having a relatively high major-axis length to minor-axis length ratio is 1.22 times or more than a value obtained by dividing, by a sum of respective minor-axis lengths Sx', a sum of respective major-axis lengths Lx' of a plurality of second crystal grains each having a relatively low major-axis length to minor-axis length ratio.

7. The multilayer capacitor of claim 1, wherein among at least four crystal grains included in the cover layer, a weight of a plurality of first crystal grains each having a relatively high major-axis length to minor-axis length ratio is 19.4% or more and 84.7% or less of a total weight of a plurality of second crystal grains each having a relatively low major-axis length to minor-axis length ratio.

8. The multilayer capacitor of claim 1, wherein the value obtained by dividing the sum of Lx by the sum of Sx is greater than a value obtained by dividing a sum of respective major-axis lengths of a plurality of crystal grains included in the at least one dielectric layer by a sum of respective minor-axis lengths of the plurality of crystal grains included in the at least one dielectric layer.

9. A multilayer capacitor comprising:

a body including a capacitance region in which at least one first internal electrode and at least one second internal electrode are alternately stacked on each other, having at least one dielectric layer interposed therebetween in a first direction; and first and second external electrodes disposed on the body while being spaced apart from each other to be respectively connected to the at least one first internal electrode and the at least one second internal electrode, wherein the body further includes a cover layer disposed to overlap the capacitance region in the first direction, a value obtained by dividing a sum of respective major-axis lengths Lx of a plurality of crystal grains included in the cover layer by a sum of respective minor-axis lengths Sx of the plurality of crystal grains included in the cover layer is greater than a value obtained by dividing a sum of respective major-axis lengths of a plurality of crystal grains included in the at least one dielectric layer in the capacitance region by a sum of respective minor-axis lengths of the plurality of crystal grains included in the at least one dielectric layer in the capacitance region, the cover layer includes an upper cover layer providing an upper surface of the body and a lower cover layer providing a lower surface of the body, a portion of the first or second external electrode is disposed on a portion of the upper or lower surface of the body, the plurality of crystal grains included in the cover layer are the plurality of crystal grains closest to a center of one of the upper cover layer and the lower cover layer, based on a cross section of the body, including the center and formed by a second direction in which the first and second external electrodes face each other and the first direction, and the plurality of crystal grains included in the at least one dielectric layer are the plurality of crystal grains closest to a center in the dielectric layer closest to a center of the body among the at least one dielectric layer.

10. The multilayer capacitor of claim 9, wherein the at least one dielectric layer and the cover layer each include a barium titanate ($BaTiO_3$)-based ceramic material, and the cover layer has a thickness greater than a thickness of one of the at least one dielectric layer.

11. The multilayer capacitor of claim 9, wherein the value obtained by dividing the sum of Lx by the sum of Sx is 1.15 or more and 2.85 or less.

12. The multilayer capacitor of claim 9, wherein a volume of each of the plurality of crystal grains included in the cover layer is greater than a volume of each of the plurality of crystal grains included in the at least one dielectric layer.

13. The multilayer capacitor of claim 9, wherein among at least four crystal grains included in the cover layer, a weight of a plurality of first crystal grains each having a relatively high major-axis length to minor-axis length ratio is 19.4% or more and 84.7% or less of a total weight of a plurality of second crystal grains each having a relatively low major-axis length to minor-axis length ratio.

14. A multilayer capacitor comprising:

a body including a capacitance region in which at least one first internal electrode and at least one second internal electrode are alternately stacked on each other, having at least one dielectric layer interposed therebetween in a first direction; and first and second external electrodes disposed on the body while being spaced apart from each other to be respectively connected to the at least one first internal electrode and the at least one second internal electrode, wherein the body further includes a cover layer disposed to overlap the capacitance region in the first direction, 1.11 or more is a value obtained by dividing a sum of respective major-axis lengths Lx of a plurality of crystal grains included in the cover layer by a sum of respective minor-axis lengths Sx of the plurality of crystal grains, and among at least four crystal grains included in the cover layer, a weight of a plurality of first crystal grains each having a relatively high major-axis length to minor-axis length ratio is 19.4% or more and 84.7% or less of a total weight of a plurality of second crystal grains each having a relatively low major-axis length to minor-axis length ratio.

* * * * *